Patented May 1, 1934

1,956,913

UNITED STATES PATENT OFFICE 1,956,913

BEAN FLOUR AND PROCESS OF MAKING SAME

Diego Véron, Chicago, Ill., assignor, by mesne assignments, to J. R. Short Milling Company, Chicago, Ill., a corporation of Illinois No Drawing. Application June 25, 1928, Serial No. 288,295. Renewed March 13, 1934

8 Claims. (Cl. 99—10)

This invention relates to food products, and more particularly to bean flour and processes of preparing the same.

The object of the invention is to produce an improved bean flour which may be used in preparing a variety of food products, and which is especially adapted for use in combination with bread dough or with flour and other ingredients used to make bread dough, to produce bread, the structure, quality and color of which will be superior to bread prepared without the use of bean flour made according to my invention.

The beneficial results referred to are accomplished by preparing bean flour according to my improved method, about to be described, and by using a relatively small quantity thereof in combination with the usual ingredients for making bread.

Bean flour made according to known methods has heretofore been used as a wheat flour substitute. Because of the methods used in preparing such bean flour and also because of the use of relatively large quantities thereof as compared with the quantity of wheat flour in the dough, the wheat gluten content of the resultant dough has been unduly lessened, and soggy, heavy bread has been produced. I have found that by preparing bean flour according to my improved method and by using a relatively small quantity, for example one-half of one percent to two percent of bean flour to wheat flour, I am enabled to produce bread of superior quality, flavor and color of crumb especially with yellowish or creamy flours.

In addition to the characteristic of improving the volume, structure and baking quality of bread dough, my bread improver also has the effect of improving the color of bread crumb made from unbleached or lightly bleached flour to which my product has been added. This bleaching effect is thought to be due to the presence of carotin-removing enzymes in some vegetable matter, such as beans and their substitutes.

As stated, bean flour has heretofore been used as a wheat flour substitute, but in order to prevent it from becoming rancid, the processes for preparing the bean flour of the prior art have always included heat treatment. The effect of such heat treatment has been to render inactive the natural carotin-removing enzymes contained in fresh beans, peas, and the like. Therefore, such heat treated bean flour, when added to bread dough or flour, has not functioned as an improver of the baking quality nor as a bleaching agent.

The flour may be made from navy beans or other beans, and there may be added to the beans in the treatment thereof a small quantity of mineral salt, such as calcium phosphate or ammonium phosphate, for the purpose of stimulating fermentation and developing the natural gluten of the flour.

In carrying out my process for the production of the improved bean flour, I proceed as follows: A green malt infusion is prepared by using two to three percent by weight of solids to water; that is, germinated barley or other malt grain is ground and steeped in water, and then the solution is filtered or strained. This strained solution may then be added to the beans, or there may first be added to the solution a small quantity of mineral salt, such as three percent of ammonium phosphate or calcium phosphate. The green malt solution, either with or without the mineral salt, is added to the beans, the proportion used being from two to six parts, by weight, of the solution to one hundred parts of beans, depending on the original moisture content of the beans. The beans, wet by the solution described, are kept for eight to twelve hours at approximately 60° F., at the end of which time they will have absorbed the solution. The next step in the process is to subject the beans to grinding and bolting in a manner familiar in the flour milling art.

The addition of the mineral salt to the green malt infusion makes the bean flour treated therewith a superior yeast food which stimulates fermentation. By being subjected to the treatment described, the latent enzymes or unorganized ferments of the beans are materially activated.

If a mineral salt such as ammonium phosphate or calcium phosphate is added to the ground and bolted bean flour in the proportions of approximately 85% bean flour and 15% mineral salt, a superior yeast food and bread improver is obtained.

Examples of such mixtures are:

|   | Percent |
|---|---|
| 1. Treated bean flour | 85 |
| Calcium phosphate | 15 |
| 2. Treated bean flour | 85 |
| Ammonium phosphate | 15 |

While I prefer to use navy beans, other beans or their substitutes may be used. I have experimented with Mexican beans, chick peas, green peas, soya beans and lima beans and find that these are as useful as navy beans, to which I have heretofore specifically referred. Alfalfa has also produced good results. Therefore, when I refer to "bean flour," I do not intend to be limited to a product made from any particular kind of legume. Obviously, the green malt infusion may be prepared by using grains other than barley. The proportion of malt and water used in preparing the green malt infusion, the quantity of the solution to be used with the beans, and the temperature at which they are maintained may also be varied without departing from the scope of my invention.

By using beans or other vegetable matter in which carotin-destroying or -removing enzymes are present, a bread improver having dough bleaching properties is produced, and by treating the beans or other matter with a malt infusion as herein described, the latent enzymes and unorganized ferments are activated, resulting in improved color and baking qualities of the dough to which the product has been added.

I claim as my invention:

1. An improvement in the process of preparing bean flour which consists in treating the beans with a green malt infusion, to which a mineral salt has been added.

2. The process of preparing bean flour, which consists in treating the beans by wetting them with a green malt infusion to which a mineral salt has been added, maintaining the wet beans for eight to twelve hours at approximately sixty degrees Fahrenheit, and then grinding and bolting the product.

3. An improvement in the process of preparing bean flour, which consists in treating the beans with a green malt infusion to which about three percent of ammonium phosphate has been added, the proportion of the infusion to the beans being from about two to six parts to one hundred parts of beans, depending upon the original moisture content of the beans.

4. The process of preparing bean flour which consists in wetting the beans with a green malt infusion to which about three percent of ammonium phosphate has been added, the proportion of the infusion to beans being from about two to six parts of infusion to one hundred parts of the beans, maintaining the wet beans for eight to twelve hours at a temperature of approximately sixty degrees Fahrenheit, and then grinding and bolting the resultant product.

5. Bean flour in which the unorganized ferments have been activated by the addition of green malt infusion and mineral salts to the beans.

6. A bread ingredient consisting of approximately eighty-five percent of bean flour which has been treated with a green malt infusion and approximately fifteen percent ammonium phosphate.

7. The process of preparing a bread improver which consists in treating fresh beans by wetting them with a green malt infusion, maintaining the wet beans for eight to twelve hours at approximately 60° F., then grinding and bolting the product.

8. A bread improver comprising fresh legumes containing active carotin-removing enzymes and green malt infusion in the proportion of two to six parts by weight of the green malt infusion to one hundred parts of the legumes, said malt infusion being of such a strength as is obtained by steeping substantially two to three parts by weight of a germinated grain in one hundred parts of water.

DIEGO VÉRON.